US008407689B2

(12) United States Patent
Dournov et al.

(10) Patent No.: US 8,407,689 B2
(45) Date of Patent: Mar. 26, 2013

(54) UPDATING NODES CONSIDERING SERVICE MODEL CONSTRAINTS

(75) Inventors: Pavel A. Dournov, Sammamish, WA (US); Frederick J. Smith, Redmond, WA (US); Vamshidhar Kommineni, Bellevue, WA (US); Anil A. Ingle, Woodinville, WA (US); Matthew M. Kerner, Seattle, WA (US); Adam Liechty, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 12/823,730

(22) Filed: Jun. 25, 2010

(65) Prior Publication Data
US 2011/0321031 A1 Dec. 29, 2011

(51) Int. Cl.
G06F 9/44 (2006.01)
(52) U.S. Cl. ...................................................... 717/172
(58) Field of Classification Search .......... 717/168–172, 717/103, 176; 709/219–226, 203, 206; 706/45; 705/7.26; 726/1, 3, 8, 11; 348/14.01; 707/664, 707/770, 785
See application file for complete search history.

(56) References Cited

U.S. PATENT DOCUMENTS

| 2004/0015957 | A1 | 1/2004 | Zara et al. |
| 2007/0078982 | A1* | 4/2007 | Aidun et al. ................... 709/225 |
| 2009/0007105 | A1 | 1/2009 | Fries |
| 2009/0100420 | A1 | 4/2009 | Sapuntzakis |
| 2010/0031247 | A1 | 2/2010 | Arnold et al. |
| 2010/0058318 | A1 | 3/2010 | Bernabeu-Auban |
| 2010/0106812 | A1 | 4/2010 | Bernabeu-Auban et al. |
| 2010/0107015 | A1 | 4/2010 | Bernabeu-Auban et al. |
| 2010/0332456 | A1* | 12/2010 | Prahlad et al. ................. 707/664 |
| 2010/0332617 | A1* | 12/2010 | Goodwin et al. .............. 709/219 |
| 2011/0126168 | A1* | 5/2011 | Ilyayev ........................ 717/103 |
| 2011/0252420 | A1* | 10/2011 | Tung et al. ......................... 718/1 |
| 2011/0258692 | A1* | 10/2011 | Morrison et al. ............... 726/11 |

OTHER PUBLICATIONS

PCT International Search Report in PCT/US2011/040064, dated Feb. 9, 2012, 3 pages.
Deuby, Sean, "Exhibit A for Virtualization Complexity: Patch Management", Published Date: Dec. 15, 2009, 2 pages, Platform Vision, http://blogs.platformvision.com/FaceOff/Virtualization/BlogDetail.aspx?postids=98c46ef6-97b6-419c-acca-c9e4368edc5a&category=Virtualization%20FaceOff.
Smith, Erick, "Cloud Computing @ Microsoft France, PDC2008—Inside the Cloud Computing Hosting Environment", Published Date: Oct. 30, 2008, 2 pages, http://blogs.msdn.com/cloudcomputing/archive/2008/10/30/pdc2008-inside-the-cloud-computing-hosting-environment.aspx.

(Continued)

*Primary Examiner* — Tuan A Vu
(74) *Attorney, Agent, or Firm* — Shook Hardy & Bacon LLP

(57) ABSTRACT

Methods, systems, and computer-readable media for deploying an update to nodes propagated throughout a data center are provided. Launching new upgrade to hosting environment residing on the nodes typically invokes a mechanism (e.g., fabric controller) to form a group of nodes that are independent of one another with respect to upgrade domains, which are assigned to tenants (e.g., program components of service applications running within the data center) presently hosted by the nodes. The constraints of the update domains are articulated by service level agreements established for the service applications, respectively. Forming the group involves identifying independent nodes for membership, where no two members of the group host analogous tenants (belonging to a common service application) that are assigned to distinct update domains. However, it is acceptable to join to the group those nodes hosting analogous tenants that are each assigned to the same update domain.

14 Claims, 7 Drawing Sheets

OTHER PUBLICATIONS

Caballero, et al., "Would Diversity Really Increase the Robustness of the Routing Infrastructure against Software Defects?", Published Date: Feb. 12, 2008, 15 pages, http://www2.research.att.comi~jiawang/coloring_ndss08_cr.pdf.

Boman, et al., "A Scalable Parallel Graph Coloring Algorithm for Distributed Memory Computers", Published Date: Sep. 2, 2005, 10 pages, http://www.cs.purdue.edu/homes/agebreme/publications/EuroPar05_coloring.pdf.

* cited by examiner

UPDATING NODES CONSIDERING SERVICE MODEL CONSTRAINTS

BACKGROUND

Large-scale networked systems are commonplace systems employed in a variety of settings for running applications and maintaining data for business and operational functions. For instance, a data center may support operation of a variety of service applications (e.g., web applications, email services, search engine services, etc.). These large-scale networked systems typically include a large number of nodes distributed throughout the data center, in which each node resembles a physical machine or a virtual machine running on a physical host. Due partly to the large number of the nodes that may be included within such large-scale systems, deployment of software (both operating systems (OSs) and applications) to the various nodes and maintenance of the software (e.g., performing updates) on each node can be a time-consuming and costly process.

Similar to other articles of software, these distributed service applications are susceptible to software failures or bugs affecting the software installed on the nodes of the data center. Therefore, it is necessary to roll out new versions of the software to fix errors (e.g., security vulnerabilities) within, or improve the functionality offered by the nodes. In both cases, it is often necessary to stop and then restart potentially each and every one of the nodes, as well as component programs (e.g., tenants) of a customer's service application residing on the nodes, in order to properly perform an update.

At the present time, data-center administrators are limited to an individualized process that employs mechanisms or manual efforts directed toward installing and updating software individually on each node in a piecemeal fashion. Otherwise, an administrator of the data center risks interruption and unavailability of the service applications running on top of the nodes comprising the data center. For instance, performing a comprehensive upgrade of a current piece of software (e.g., root operating system (OS) or hypervisor) installed throughout the data center typically involves shutting down one node at a time, applying the appropriate upgrade, and then rebooting the node prior to accessing another node.

Accordingly, the current process for performing a comprehensive update to a multitude of nodes, which often relies on the data-center administrators to manually perform the updates individually, are ad hoc solutions, are labor-intensive, and are error-prone. Further, these current solutions do not guarantee a reliable result that is consistent across the data center. These shortcomings of individualized upgrades are exaggerated when the data center is expansive in size, comprising a multitude of interconnected hardware components (e.g., nodes), that support the operation of a multitude of service applications.

As such, providing a reliable mechanism for understanding a distribution of the component programs of the service applications across the data-center nodes and applying this understanding to update two or more nodes at once while honoring service level agreements (SLAs) established for the service applications would potentially ameliorate the problematic results of the piecemeal update processes currently in place.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to computer systems, computerized methods, and computer-readable media for deploying an update concurrently on a plurality of nodes propagated throughout a distributed computing platform. Initially, the nodes represent physical hosts (e.g., computing devices) capable of running tenants of a customer's service application within the distributed computing platform. As used herein, the term "tenants" broadly refers to instances of one or more roles of a service application. These "instances" typically represent copies or replications of at least one role, which resembles a component program, for supporting particular functional aspects of the service application.

The deployment of an update may be invoked upon receiving an indication to install a patch to a root operating system (OS) or hypervisor residing on the nodes of the data center. At this point, a fabric controller (i.e., mechanism provisioned to manage and schedule installations and updates within the data center) is triggered to form a group of nodes that are independent of one another with respect to upgrade domains, which are assigned to tenants presently hosted by the nodes. As more fully discussed herein, the phrase "upgrade domain" generally represents a maximum portion of a service application, or class of tenant thereof, that can be made unavailable without substantially degrading the performance of the service application. Typically, the constraints (e.g., particular of role instances or percentage of total service application) of the update domains are articulated by a service model (e.g., service level agreement (SLA)) established for the service application.

In an exemplary embodiment, forming a group of independent nodes involves selecting an initial group of nodes, where no two members of the group of nodes host analogous tenants, respectively, of a common service application, and where the analogous tenants are assigned to differing update domains. That is, it is acceptable to join analogous tenants (belonging to a common service application) that are each assigned to the same update domain; however, constraints of the fabric controller prohibit joining analogous tenants assigned to distinct update domains to the group of independent nodes at the same time.

When attempting to increase the size of the group of independent nodes, in order to maximize concurrent application of the update, a subject node may be identified as a candidate for membership. The subject node may remain a candidate if the following criteria are met: determining that a present state of the subject node's hosting environment (e.g., root OS or hypervisor) differs from a goal hosting-environment state having the update applied; and determining that a present number of members of the group of independent nodes shall remain beneath a specified threshold amount of nodes upon ostensibly joining the subject node to the group of independent nodes.

Upon satisfying at least the criteria above, the fabric controller may determine whether subject node qualifies as an independent node with respect to members of the group of independent nodes. This step of determining the subject node's independence may be carried out by performing one or more of the following procedures: (a) determining whether tenant(s) hosted by the subject node correspond to tenants hosted by the members of the group of independent nodes; (b) when the tenant(s) hosted by the subject node correspond to any of the tenants within the group of independent nodes, comparing update domains assigned to the corresponding tenants against update domains assigned to the hosted tenant(s); (c) when the update domains of the corresponding tenants match the update domains assigned to the hosted tenant(s), allowing the subject node to join the group of nodes; and (d) when the update domains of the corresponding tenants conflict with the update domains assigned to the hosted tenant(s), temporarily refraining from joining the subject node to the group of nodes.

In the embodiments above, new nodes are iteratively added to the group of independent nodes as a function of, at least, properties of the processed nodes (i.e., nodes that have recently received the update) being removed from the group. However, in other embodiments, an initial and complete group of independent nodes may be selected from the data center for concurrent updating prior to any nodes of the initial group receiving the update. In one instance, a graph-coloring algorithm may be employed to model the nodes within the data center as a graph. Next, the graph-coloring algorithm may apply a coloring scheme onto the graph as a function of the update domains assigned to tenants residing on the nodes. Upon application of the coloring scheme, those nodes bearing one common color are aggregated as a first group of independent nodes, while those nodes bearing another color are aggregated as a second group of independent nodes, and so on. The members of the first group of independent nodes are subsequently staged for receiving the update in tandem. Upon the entirety of the first group of independent nodes receiving the update, the members of the second group of independent nodes are staged for receiving the update in tandem. As such, the nodes may be concurrently updated in waves of individual groups, or concurrently via an evolving group that periodically accepts and releases members, as discussed above.

BRIEF DESCRIPTION OF THE DRAWINGS

Embodiments of the present invention are described in detail below with reference to the attached drawing figures, wherein.

DETAILED DESCRIPTION

Figure 1:
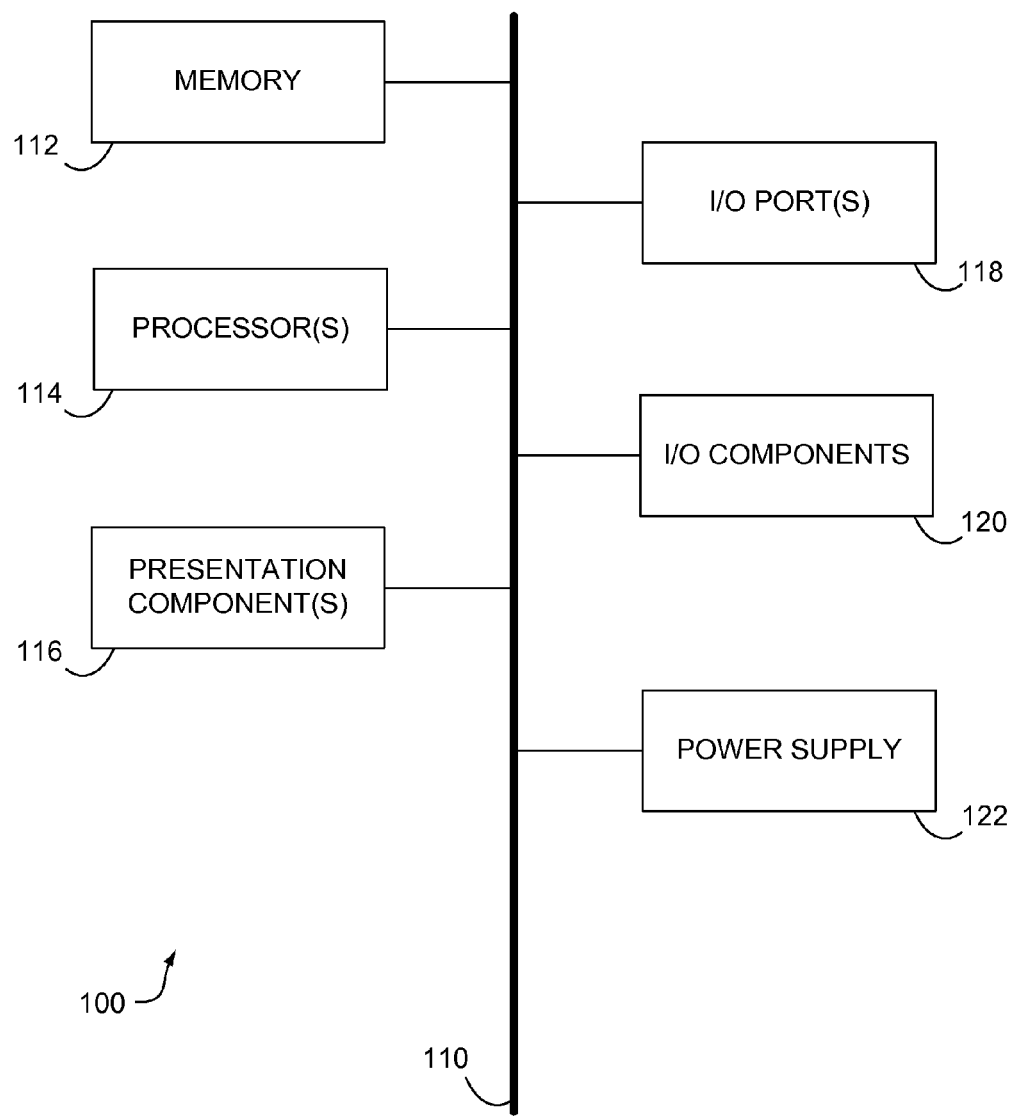
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer-storage media having computer-executable instructions embodied thereon that, when executed, perform methods in accordance with embodiments hereof, for updating a root operating system (OS) or hypervisor of a plurality of nodes (e.g., computing devices) within the context of a distributed computing environment. Generally, the update is carried out expediently by applying a software upgrade to a plurality of nodes at once, while, at the same time, honoring the guarantees of the service models established for the service applications running on top of the nodes. In an exemplary embodiment, honoring the service-model guarantees involves allowing only independent nodes to be concurrently updated, where nodes are deemed independent with respect to each other based on the update domains assigned thereto.

Accordingly, in one aspect, embodiments of the present invention relate to one or more computer-readable media that has computer-executable instructions embodied thereon that, when executed, perform a method for updating one or more nodes of a data center in compliance with service models established for service applications running within the data center. Initially, the method involves the step of providing a group of independent nodes (hereinafter "group") that are preselected for receiving an update. At some point, a subject node is identified as a candidate for joining the group. The subject node may remain a candidate if the following criteria are met: determining that a present state of the subject node's root OS or hypervisor differs from a goal root-OS state having the update applied; and determining that a present number of members of the group shall remain beneath a specified threshold amount of nodes upon ostensibly joining the subject node to the group.

Upon satisfying at least the criteria above, the fabric controller may determine whether subject node qualifies as an independent node with respect to members of the group. This step of determining the subject node's independence may be carried out by performing one or more of the following comparison process: (a) determining whether tenant(s) hosted by the subject node correspond to tenants hosted by the members of the group; (b) when the tenant(s) hosted by the subject node correspond to any of the tenants within the group, comparing update domains assigned to the corresponding tenants against update domains assigned to the hosted tenant(s); (c) when the update domains of the corresponding tenants match the update domains assigned to the hosted tenant(s), allowing the subject node to join the group; and (d) when the update domains of the corresponding tenants conflict with the update domains assigned to the hosted tenant(s), temporarily refraining from joining the subject node to the group. Further, upon determining that the subject node qualifies as an independent node, the method involves writing to a storage location (e.g., listing enumerating a current membership of the group) an indicia that the subject node is joined as a member of the group.

In another aspect, embodiments of the present invention relate to a computerized method for allocating nodes to role instances of service applications with consideration of update domains assigned to the role instances. One step of the method may include distributing on nodes of a data center various role instances that support the service applications presently running within the data center. An association between the nodes and the service applications running thereon may be written to a list. Further, the nodes allocated to each of the role instances may be mapped against update domains assigned to each of the role instances.

In an exemplary embodiment, the mechanism (e.g., fabric controller) carries out the method by employing the list and the mapping when allocating node(s) to an instance of a subject role. The step of allocating the node(s) to an instance of a subject role may include reading the list to identify role instances presently residing on a particular node, and refraining from placing the subject role instance on the particular node when the subject role instance is analogous to the identified role instances.

The method may further involve the step of selecting an appropriate update domain to assign to the subject role that is placed on the allocated node(s). Typically, selection facilitates maximizing a number of nodes, which include the allocated node, that are updateable in tandem. In embodiments, selecting the appropriate update domain to assign to the subject role includes one or more of the following steps: reading the list to identify service applications having role instances presently residing on the allocated node; reading the mapping to identify the update domains that are assigned to the role instances of the identified service applications; ascertaining an update domain of the identified update domains that most frequently appears on nodes of the data center that host the role instances of the identified service applications; and assigning the most-frequently-appearing update domain to the subject role.

In a third aspect, an exemplary computer system is provided for performing a method that comprehensively updates nodes of a data center with consideration of both service models established for customers of the data center and pending localized comprehensive updates of service applications owned by the customers. In embodiments, the computer system includes a processing unit coupled to a computer storage medium that stores a plurality of computer software components executable by the processing unit. Initially, the computer software components include a fabric controller and a synchronization mechanism. The fabric controller initiates the comprehensive update to the nodes of the data center. Typically, the comprehensive update concurrently affects a group of nodes that are determined to be independent of one another. In an exemplary embodiment, the determination of independence involves a comparison process that includes, but is not limited to, one or more of the following steps: maintaining a listing of tenants (e.g., instances of roles of service applications) hosted by members of the group; and mapping the update domains assigned to the tenants, respectively, within the listing. Typically, each of the update domains represents a percentage of instances of the particular role of the particular service application that are allowed to be concurrently offline. This percentage may be dictated by a service model (e.g., service level agreement (SLA)) established for the particular service application. The comparison process may additionally involve the step of disallowing a subject node to join the group upon determining (a) that the subject node hosts one or more tenants that correspond to at least one of the tenants enumerated by the listing and (b) that the subject-node tenants are assigned an update domain that differs from the update domain mapped to the corresponding tenant of the listing.

The synchronization mechanism is provided to ensure that the service model is not violated. Generally, this is achieved by performing a synchronization process that includes the following steps: identifying that a localized update is pending for the particular service application; and appending as entries to the listing indications of update domains assigned to tenants of the particular service application, thereby abstaining from joining nodes hosting the tenants of the particular service application to the group designated to receive the comprehensive update.

Embodiments of the present invention relate to deploying an upgrade to operating systems accommodated by nodes that are distributed throughout a distributed computing environment, or data center. In one instance, the nodes represent computing devices capable of running role instances (i.e., tenants) of the service application within a distributed computing platform. As used herein, the term "roles" or role instances is not meant to be limiting, but may include any replication of at least one role, which generally resembles a component program that supports particular functional aspects of a service application.

As such, "roles" provide a template description of a functional portion of the service application. Roles are described by indicating the computer code implementing the role, the conditions within the hosting environment that are required by the role, configuration settings to be applied to the role, and the role's set of endpoints for communication with other roles, elements, etc. In one instance, the role's configuration settings may include collective settings which are shared by all instances of the role, or individual settings that are particular to each instance of the role. In an exemplary embodiment, the roles each represent a particular class of component of the service application. Typically, the service model delineates how many instances of each of the one or more roles to place within the data center, where each of the instances is a replication of the particular class of component, or role. In other words, each role represents a collection of instances of each class of components, where the service application may have any number of classes of components for carrying out functions thereof.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including hand-held devices, consumer electronics, general-purpose computers, specialty computing devices, etc. Embodiments of the invention may also be practiced in distributed computing platforms where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
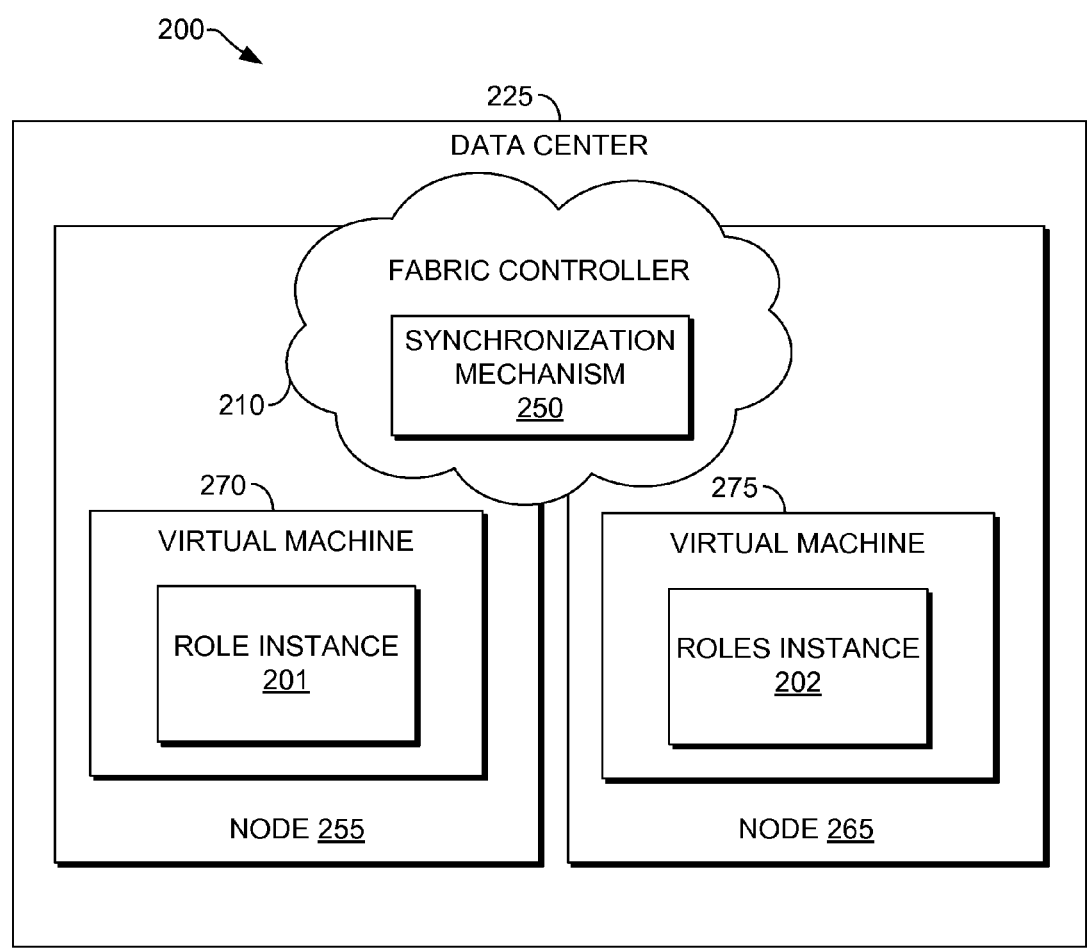
FIG. 2 is a block diagram illustrating a distributed computing environment, suitable for use in implementing embodiments of the present invention, that is configured to apply an update concurrently to members of a group of independent nodes.

With reference to FIGS. 1 and 2, a first node 255 and/or second node device 265 may be implemented by the exemplary computing device 100 of FIG. 1. Further, tenant 201 and/or tenant 202 may be provided with access to portions of the memory 112 of FIG. 1 and/or allocated an amount of processing capacity available at the processors 114 of FIG. 1 for conducting operations that support their respective service applications.

Turning now to FIG. 2, a block diagram illustrating a distributed computing environment 200 is shown, which is suitable for use in implementing embodiments of the present invention. In an exemplary embodiment, the distributed computing environment 200 is configured to apply an update concurrently to members of a group of independent nodes. The distributed computing environment 200 includes the data center 225 configured to accommodate and support operation of component programs, or instances of roles, of a particular service application according to the fabric controller 210. It will be understood and appreciated that the data center 225 shown in FIG. 2 is merely an example of one suitable for accommodating one or more service applications and is not intended to suggest any limitation as to the scope of use or functionality of embodiments of the present invention. Neither should the data center 225 be interpreted as having any dependency or requirement related to any single resource, combination of resources, combination of nodes (e.g., nodes 255 and 265), or set of APIs to access the resources and/or nodes.

Further, it will be understood and appreciated that the cloud computing platform 200 shown in FIG. 2 is merely an example of one suitable computing system environment and is not intended to suggest any limitation as to the scope of use or functionality of embodiments of the present invention. For instance, the cloud computing platform 200 may be a public cloud, a private cloud, or a dedicated cloud. Neither should the cloud computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of nodes, virtual machines, data centers, tenants, or combinations thereof may be employed to achieve the desired functionality within the scope of embodiments of the present invention.

The cloud computing platform 200 includes the data center 225 configured to host and support operation of tenants 201 and 202 of a particular service application. The phrase "service application," as used herein, broadly refers to any software, or portions of software, that runs on top of, or accesses storage locations within, the data center 225. In one embodiment, one or more of the tenants 201 and 202 may represent the portions of software, component programs, or instances of roles that participate in the service application. In another embodiment, one or more of the tenants 201 and 202 may represent stored data that is accessible to the service application. It will be understood and appreciated that the tenants 201 and 202 shown in FIG. 2 are merely an example of suitable parts to support the service application and are not intended to suggest any limitation as to the scope of use or functionality of embodiments of the present invention.

Generally, virtual machines 270 and 275 are allocated to the tenants 201 and 202 of the service application based on demands (e.g., amount of processing load) placed on the service application. As used herein, the phrase "virtual machine" is not meant to be limiting, and may refer to any software, application, operating system, or program that is executed by a processing unit to underlie the functionality of the tenants 201 and 202. Further, the virtual machines 270 and 275 may include processing capacity, storage locations, and other assets within the data center 225 to properly support the tenants 201 and 202.

In operation, the virtual machines 270 and 275 are dynamically allocated within resources (e.g., first node 255 and second node 265) of the data center 225, and endpoints (e.g., the tenants 201 and 202) are dynamically placed on the allocated virtual machines 270 and 275 to satisfy the current processing load. In one instance, a fabric controller 210 is responsible for automatically allocating the virtual machines 270 and 275 and for placing the tenants 201 and 202 within the data center 225. By way of example, the fabric controller 210 may rely on a service model (e.g., designed by a customer that owns the service application) to provide guidance on how, where, and when to allocate the virtual machines 270 and 275 and to place the tenants 201 and 202 thereon.

In addition, the fabric controller 225 may be provisioned with responsibility to manage installations of updates to the nodes 255 and 265. By way of example, the fabric controller 210 may rely on a service model to provide data related to update domains of the service application in order to strategically place the tenants 201 and 202 on appropriate nodes based on a current topology of the data center 225. In another example, the fabric controller 210 honor guarantees of the service model by strategically selecting the tenants 201 and 202 for joining a group of independent nodes scheduled for receiving the update, where strategic selection is accomplished by ensuring that only one update domain for each tenant of the service application is scheduled for receiving the update at a time.

As discussed above, the virtual machines 270 and 275 may be dynamically allocated within the first node 255 and second node 265. Per embodiments of the present invention, the nodes 255 and 265 represent any form of computing devices, such as, for example, a personal computer, a desktop computer, a laptop computer, a mobile device, a consumer electronic device, server(s), the computing device 100 of FIG. 1, and the like. In one instance, the nodes 255 and 265 host and support the operations of the virtual machines 270 and 275, while simultaneously hosting other virtual machines carved out for supporting other tenants of the data center 225. Often, the tenants 201 and 202 may include endpoints of distinct service applications owned by different customers.

Typically, each of the nodes 255 and 265 include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes 255 and 265 to enable each device to perform a variety of processes and operations. In another instance, the computing unit may encompass a processor (not shown) coupled to the computer-readable medium accommodated by each of the nodes 255 and 265. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Figure 3:
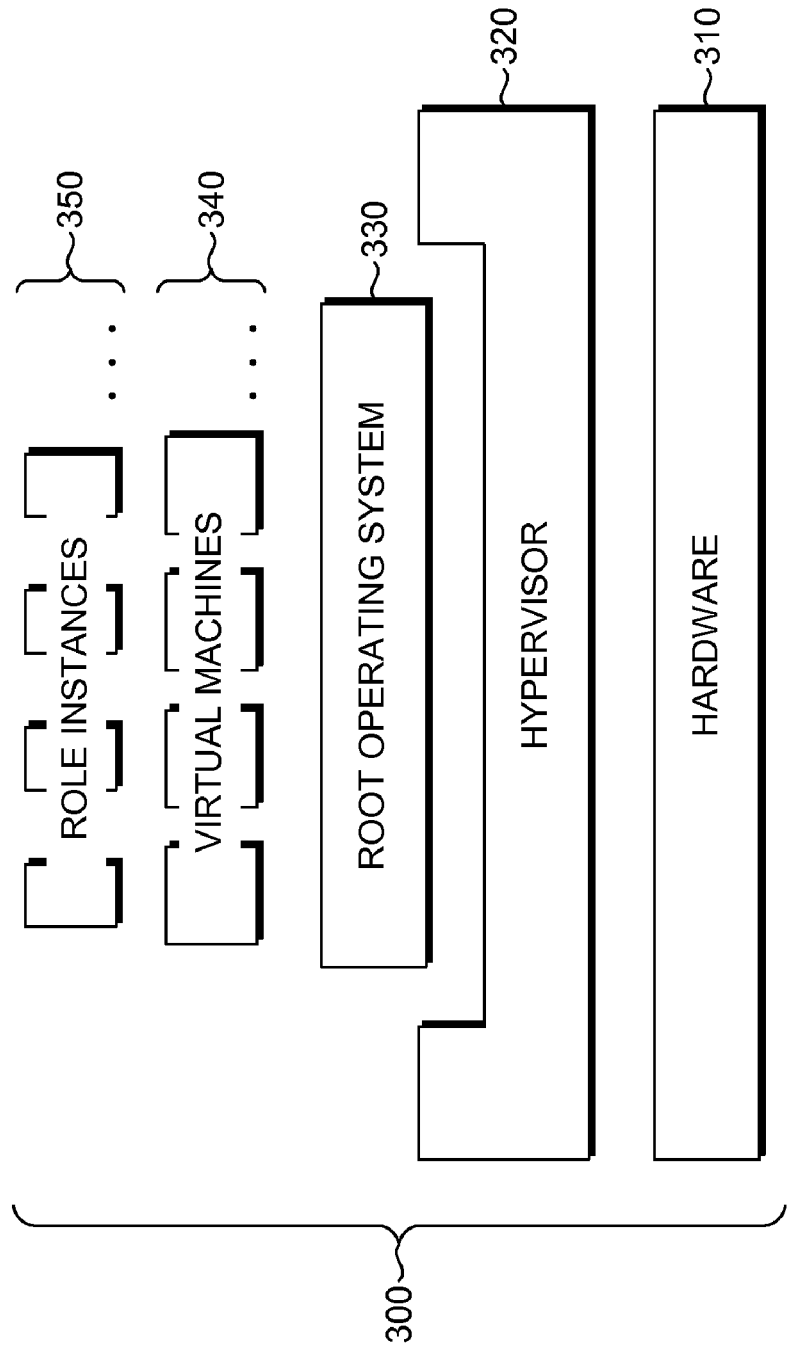
FIG. 3 is a diagrammatic view of exemplary layers within a node, in the context of embodiments of the present invention.

Per embodiments of the present invention, the nodes 255 and 265 execute root operating systems and at least one hypervisor, which is discussed more fully with respect to FIG. 3. Further, the role instance(s) (e.g., tenants 201 and 202) that reside on the nodes 255 and 265 support operation of service applications, and may be interconnected via application programming interfaces (APIs). In one instance, one or more of these interconnections may be established via a network cloud (not shown). The network cloud serves to interconnect resources, such as the tenants 201 and 202, which may be distributably placed across various physical hosts, such as nodes 255 and 265. In addition, the network cloud facilitates communication over channels connecting the tenants 201 and 202 of the service applications running in the data center 225. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

In an exemplary embodiment, the fabric controller 210 includes, or is operably coupled to, a synchronization mechanism 250. The synchronization mechanism 250 is generally configured to monitor ongoing updates of the root OS's and/or the hypervisor and to enforce the guarantees of the service model. One exemplary guarantee articulates that only one update domain for a service application is offline at a time. However, in cases where one service application is presently being updated by its owner, while, at the same time, a root OS and/or hypervisor update is in progress, the synchronization mechanism 250 is relied upon to take corrective actions. This is especially relevant when the service application does not recognize or detect that a root OS/hypervisor update is simultaneously occurring. By way of example, the service application may have taken a particular tenant offline having one update domain (UD0) assigned to it, while the fabric controller 210 may be attempting to schedule an update for another node with a similar tenant hosted thereon. If the hosted tenant has the same update domain (UD0), then the guarantees of the service model are upheld when the fabric controller 210 pulls the node offline. In contrast, if the hosted tenant has a different update domain (UD1), then the guarantees of the service model are violated when the fabric controller 210 pulls the node offline.

In this second instance, or in both instances above, the synchronization mechanism 250 may perform the following steps: detect the customer-initiated (localized) update to the software of the service application; and determine whether the customer's service application presently has an update domain offline as a result of the owner's self-initiated update schedule. If so, an indicia of the service application is added to a list of applications being updated, even though the service application may not be presently participating in the ongoing comprehensive update conducted by the fabric controller 210. Adding the service-application indicia to the list effectively prevents the fabric controller 210 from taking another update domain offline. (The conflict is resolved in favor of the customer-initiated updates.)

In another instance, upon the synchronization mechanism 250 detecting that the customer's localized update of a service application is simultaneously occurring in tandem with a data-center-wide, comprehensive update of node hosting environments (e.g., root OS and/or hypervisor), the synchronization mechanism 250 may take the corrective action of blocking the customer's service application from taking another update domain offline. This corrective action is typically enforced when the fabric controller 210 has already taken another update domain offline for the service application for purposes of advancing the comprehensive update. (The conflict is resolved in favor of the fabric-controller updates.) Accordingly, the synchronization mechanism 250 momentarily pauses the customer-initiated update and eventually resumes the customer-initiated update upon concluding the comprehensive update. Further, the synchronization mechanism 250 is able to transparently resolve interfering updates. For instance, from the customers external perspective, the updates appear to be occurring in concurrence even though one is being stopped.

The following discussion illustrates an exemplary embodiment of the interaction between the fabric controller 210 and the synchronization mechanism 250. With reference to the discussion above, this embodiment also comprehensively updates nodes of a data center with consideration of both service models established for customers of the data center 225 and pending localized comprehensive updates of service applications owned by the customers. Initially, the fabric controller 210 may invoke a comprehensive update to the nodes of the data center. This update may be triggered by any number of events, such as a new patch that is launched for installation. In general, the comprehensive update concurrently affects a group of nodes that are determined to be independent of one another. The determination of independence involves maintaining a listing of tenants hosted by members of the group of nodes and mapping an indication of update domains assigned to the tenants, respectively, within the listing. By way of example, the update domains represent a percentage of instances of the particular role of the particular service application that are allowed to be concurrently offline, as dictated by a service model established for the particular service application.

Upon the fabric controller 210 determining (a) that the subject node hosts one or more tenants that correspond to at least one of the tenants enumerated by the listing, and (b) that the subject-node tenants are assigned an update domain that differs from the update domain mapped to the corresponding tenant of the listing, the fabric controller 210 refrains from adding a subject node to the group of nodes, at least temporarily. Meanwhile, the synchronization mechanism 250 ensures that the service model is not violated by performing a synchronization process. In an exemplary embodiment, the synchronization process involves one or more of the following steps: (a) identifying that a localized update is pending for a particular service application; and (b) appending as entries to the listing that reference update domains assigned to tenants of the particular service application. Accordingly, by adding a record of the customer-initiated updates to the listing, the fabric controller 210 recognizes the particular service application as having an update domain down and will typically abstain from joining nodes hosting the tenants of the particular service application to the group of nodes designated to receive the comprehensive update. Thus, the fabric controller 210 and the synchronization mechanism 250, when acting in concert to monitor and record customer-initiated updates, recognize overlapping updates and enact an appropriate corrective action to preserve the guarantees of the service model.

Turning now to FIG. 3, a diagrammatic view of exemplary layers within a node 300 is shown, in the context of an embodiment of the present invention. By way of background, the cloud computing environment (see reference numeral 200 of FIG. 2) hosts a number of service applications within a physical layout of its one or more data centers. Each data center tends to include racks that contain an aggregation of nodes, such as fifty physical machines, or blades, to a rack. Typically, each rack also includes a power supply and a network switch (connecting the nodes to a network) the support operation of the physical machines.

Processing capacity of the node 300 is subdivided into one or more virtual machines (VMs) 340. In this way, resources running on top of the VMs 340 can be carved into substantially exclusive elements that can run independently of each other. These VMs 340 also serve to host tenants 350 of service application(s). Thus, service applications of different customers remain isolated in operation even when running on the VMs 340 instantiated on a common node 300. By way of example, the internal isolation provided by the VMs 340 prevents sharing data from customer A to customer B when customers A and B are both allocated resources on the node 300. Accordingly, these service applications are distributed in nature, because most service applications tend to rely on multiple VMs 340 in disparate physical machines to properly function.

The fabric controller (e.g., see reference numeral 210 of FIG. 2) acts as a virtual manager for the node 300 and the virtual machines 340. For instance, the fabric controller is responsible for installing software on the node 300 to implement updates to the root OS 330 and hypervisor 320 running thereon. In general, the root OS 330 refers to a portion of a hosting environment of the node 300 for supporting the VMs 340. The hypervisor 320 typically represents software that interfaces with hardware 310 of the node 300. Typically, installing software involves powering off the hardware 310 of the node 300 and taking offline the virtual machines 340 running on top of the root OS 330. Then, upon completing installation, the hardware 310 of the node 300 is powered on, thereby rebooting and bringing online the virtual machines 340.

By way of example, the functionality of a photo-sharing application may be split into two specific roles, or tenants, and propagated to many nodes within the data center. One of the roles may act as a front-end subservice that manages a user interface (e.g., webpage running on a customer's website) for accepting and retrieving digital images. Another role may act as a back-end subservice that forwards the accepted digital images to the storage locations allocated to the photo-sharing application and catalogs the storage locations relative to the forwarded digital images to facilitate retrieval.

The support provided by the data center to the customer that owns the photo-sharing application typically complies with a service model established for the service model. For operation purposes, the service model describes how the service application is split into roles and where instances of the roles can be placed. For update purposes, the service model dictates a number of instances of roles that can be taken offline concurrently. In an exemplary embodiment, the service model governs a number of fault domains and update domains by which each role is partitioned. As such, the fabric controller may leverage the service model to limit the scope of the update in appreciation of the portion of the service application that the customer is comfortable in allowing to be unavailable. Further, although the fabric controller is described herein as the mechanism that invokes and manages the updates while honoring the service model, a data-center administrator may retain the ultimate authority in determining when and how to update the nodes.

In one embodiment, fault domains represent a number of hardware-failure units (e.g., racks, physical hosts, data centers, etc.) over which the service application should be distributed in order to promote resilience upon the cloud computing platform experiencing an internal crash or upon a data center experiencing a contained equipment failure. In another embodiment, update domains represent software-upgrade units that are controllably applied based on the service models, such that the service application is consistently running during the update. In one instance, the update domain is defined as the maximum percentage unit (e.g., 10% representing 10 VMs of a total of 100 VMs on which instances of a role are running) of the service application that may be taken down at once, per the service model, when an update of the software on nodes is in progress. Once the nodes are finished receiving the update, the VMs of a particular update domain are brought back online and another update domain is targeted for being taken offline. Generally, this process of iteratively addressing one update domain at a time is not visible to the customer of the data center.

As mentioned above, tenants 350 represent instances of the roles (i.e., logical portion of a complete software package), which are copies of a role that are running in many VMs 350 within the node 300 and across the data center. Some instances of a particular role supporting a particular service application are assigned to a first update domain, while others are assigned to a second update domain, and so on. Thus, the fabric controller is enabled to honor the service model for each service application during an upgrade by only taking one of the first or second update domains offline at a time. By way of example, when it comes time to upgrade the root OS 330 or the hypervisor 320 (generally referred to in combination as the hosting environment), the fabric controller takes the entire node 300 offline for a certain period of time to execute the upgrade. Accordingly, in light of the downtime inherent with an upgrade, embodiments of the present invention introduce technology to minimize the time required to update the root OS 330 and hypervisor 320 for all machines while at the same time satisfying the service-model imposed constraint of shutting down tenants assigned to just a single update domain for an service application at a time.

Figure 4:
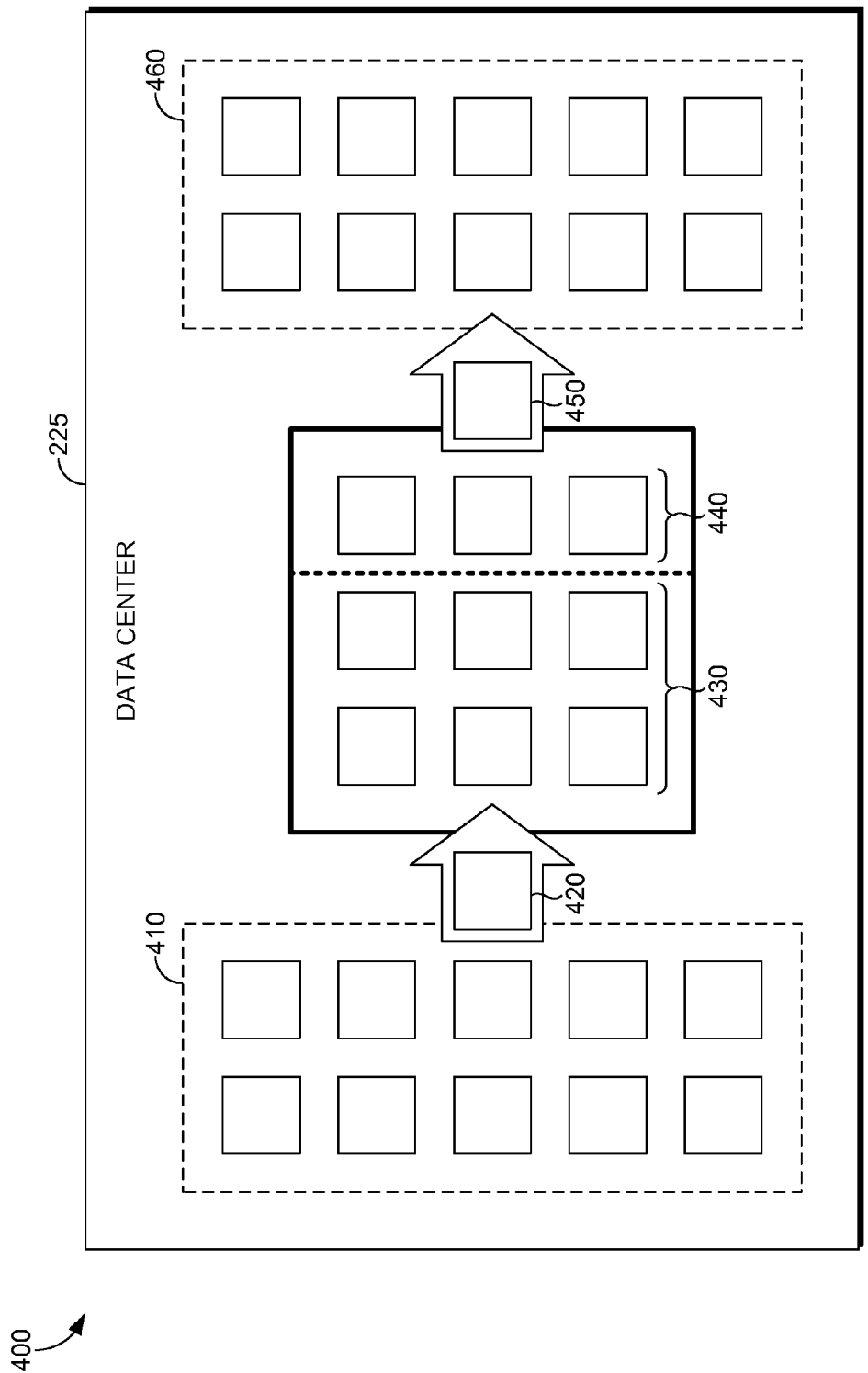
FIG. 4 is a graphical representation of a descriptive reservoir and pump technique for managing membership of the group of independent nodes, in accordance with an embodiment of the present invention.

Turning now to FIG. 4, a graphical representation 400 of a descriptive reservoir and pump technique for managing membership of the group of independent nodes is illustrated, in accordance with an embodiment of the present invention. Initially, a plurality of nodes are provided within the data center 225. Nodes 410 are depicted as being in a non-updated state, which are running a previous version of a hosting environment, while nodes 460 are depicted as being in a goal hosting-environment state, which have the update applied to their hosting environment. The "reservoir" includes nodes 430 that are scheduled to receive the update. That is, the nodes 430 have been added to the group of independent nodes and are passively staged and waiting in an online mode for a time when they may be taken offline to receive the update. The "pump" includes nodes 440 that are presently in an offline mode and actively receiving the update. The nodes 440 are also considered to be members of the group of independent nodes along with the nodes 430.

Accordingly, the combination of the nodes 430 and 440 form the group of independent nodes. When a threshold amount of nodes is specified for the group, the combination of nodes 430 and 440 is regulated to remain below the threshold. However, this threshold can dynamically vary and is typically controlled by the fabric controller. In one instance, the fabric controller uses criteria to vary the threshold, such as processing capacity at the pump. That is, the size and nodes 430 of the reservoir can be changed over time, allowing the number of nodes 430 and 440 being updated at a time to be dynamically adjusted.

In operation, node(s) 420 are added to the nodes 430 of the reservoir upon determining that the members (nodes 430 and 440) of the group of nodes remain below the current threshold. The pump is then invoked and the nodes 440 therein are processed. In embodiments, processing involves shutting the nodes 440 down such that they are offline, applying the appropriate update, restarting the nodes 440, setting up the VMs on the nodes 440, and booting up the tenants hosted by the VMs. Based on this substantial amount of processing that occurs within the pump, the amount of the nodes 440 being processed at once may be limited for purposes of risk management (e.g., in order to reduce exposure of update failure). In one example, each of the nodes 440 within the pump as well as the nodes 430 within the reservoir may be updated at the same time or may be updated incrementally. In another instance, only one node of the nodes 440 in the pump is taken down at a time.

Once completely processed, node(s) 450 are evacuated from the pump and join the nodes 460 with the goal hosting-environment state. Further, the node(s) 420 may be added to the nodes 430 of the reservoir based on the now revised group of independent nodes 430 and 440. In other words, evacuating the node(s) 450 removes members from the group of independent nodes and, thus, changes the attributes (e.g., releases update domains that blocked admittance of nodes) for joining the group. As such, the fabric controller may reexamine the pending members of the group upon the node(s) 450 being evacuated and periodically add node(s) 420, which may have been previously precluded from joining the group based prior attributes.

In one embodiment, a list is maintained that captures an indicia of the nodes 430 in the reservoir and the nodes 440 in the pump. The list may include an identity of the service application, tenant, and update domains mapped against the indicia of the nodes 430 and 440. In another embodiment, the list memorializes just those nodes 440 and respective update domains that are actively affected by the update. In this embodiment, every time a node is taken offline it is added the list (if not already there). Further, indicia of the node(s) 450 that are evacuated from the pump upon coming online are removed from the list. Thus, this list facilitates the determination of the node(s) 420 that may enter the reservoir. In yet another embodiment, the list is employed to enforce the constraint that the node(s) 420 joining the group should mutually lack update-domain dependencies in relation to the nodes 430 and 440. As used herein, an "update-domain dependency" denotes a condition in which two or more nodes host analogous tenants of a common service application that are assigned to distinct update domains, respectively. In one example of enforcing constraints, a graph-coloring algorithm is employed to select the node(s) 420 of the data center that mutually lack update-domain dependencies in relation to the nodes 430 and 440.

Figure 5:
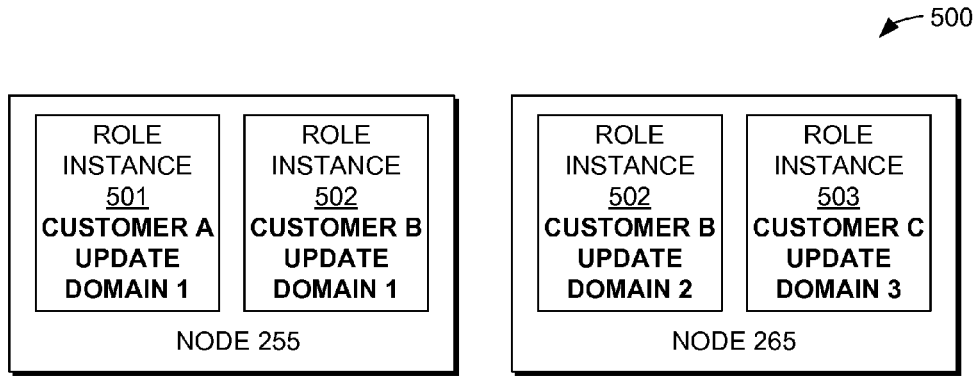
FIGS. 5-7 are schematic depictions of tenants hosted on nodes, where the tenants are assigned to various update domains, in accordance with an embodiment of the present invention.
Figure 6:
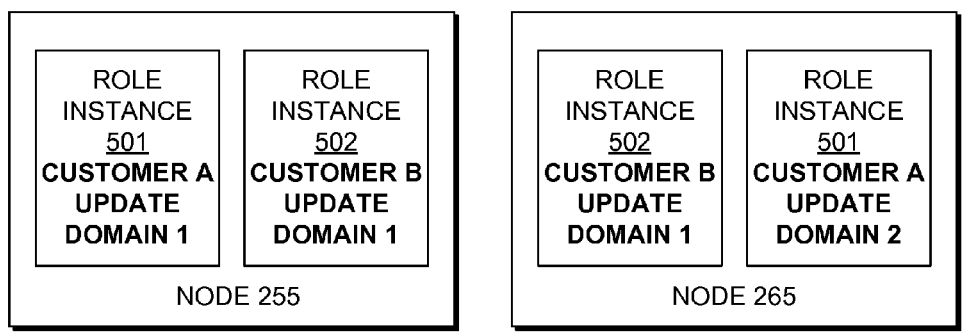
Figure 7:
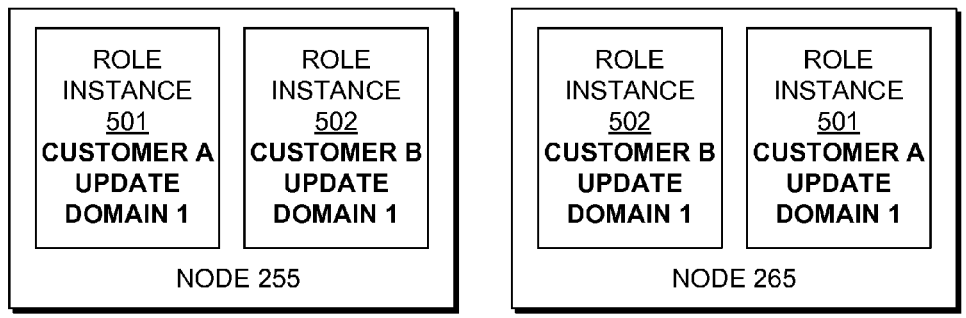

Embodiments of the graph-coloring algorithm will now be discussed with reference to FIGS. 5-7. Generally, FIGS. 5-7 illustrate schematic depictions of tenants hosted on nodes, where the tenants are assigned to various update domains in accordance with an embodiment of the present invention. Initially, "graph coloring" refers to a method for picking a maximum number of members of the group from a predefined set of candidates, where the members have some attributes that preclude the inclusion of the other candidates. As such, every time a member (node) is selected for joining the group, the remaining available candidates (nodes) for inclusion in the group are restricted, as there are additional attributes (update-domain dependencies) involved with gaining admittance to the group.

By way of example, the landscape of the data center can be thought of as vertices in a graph, and edges may be created between vertices if two nodes of the data center are hosting analogous tenants from the same application, but those two tenants are in different update domains. Upon establishing the graph, the graph-coloring algorithm may implement one or more variations of a coloring scheme. In one variation of the coloring scheme, the appropriate vertices of the graph are colored the same color at the same time. That is, a maximum number of vertices are colored and removed, as nodes are added to the group and processed, before another color is considered. In this variation, a high number of nodes are added to the group at once and are typically processed at the same time, while the balance of the nodes must wait for the reservoir to fully drain before moving to the next group of nodes, or color. This approach blocks progress on coloring new nodes until all nodes of the previous color are completely updated.

In another variation of the coloring scheme, the nodes joined to the group can be re-examined periodically. Thus, upon removing one or more nodes from the group, the graph is dynamically reevaluated to determine which nodes may be added based on the changed dependencies. This approach allows for iteratively making forward progress, even when it takes more time to update some of the nodes in the group.

With reference to FIG. 5, a schematic depiction 500 shows the nodes 255 and 265 hosting tenants 501, 502, and tenants 502, 503, respectively. The tenant 501 is part of a service application owned by customer A and is assigned to update domain (UD) 1. The tenant 502 on the node 255 is part of a service application owned by customer B and is assigned to UD1. The tenant 502 on the node 265 is part of a service application owned by customer B and is assigned to UD2. And, the tenant 503 is part of a service application owned by customer C and is assigned to UD3. Although the nodes 255 and 265 include differing tenants 501 and 503, respectively, which would typically indicate they are independent nodes, they both host the tenant 502. Because the tenant 502 on the node 255 is assigned to UD1, which is distinct from UD2 assigned to the tenant 502 on the node 265, the nodes 255 and 265 are not independent and would be colored differently by the graph-coloring algorithm.

With reference to FIG. 6, a schematic depiction 600 shows the nodes 255 and 265 hosting tenants 501, 502, and tenants 502, 501, respectively. As above, the tenant 501 is part of a service application owned by customer A and is assigned to UD1. The tenant 502 on the node 255 is part of a service application owned by customer B and is assigned to UD1. The tenant 502 on the node 265 is part of a service application owned by customer B and is now assigned to UD1. And, the tenant 501 is part of a service application owned by customer A and is assigned to UD2. Upon evaluation, the nodes 255 and 265 both include tenants 501, which are both assigned to the same UD1. Thus, initially, the nodes 255 and 265 are independent. However, because the tenant 501 on the node 255 is assigned to UD1, which is distinct from UD2 assigned to the tenant 501 on the node 265, the nodes 255 and 265 are not independent and would be colored differently by the graph-coloring algorithm.

With reference to FIG. 7, a schematic depiction 700 shows the nodes 255 and 265 hosting tenants 501, 502, and tenants 502, 501, respectively. As above, the tenant 501 is part of a service application owned by customer A and is assigned to UD1. The tenant 502 on the node 255 is part of a service application owned by customer B and is assigned to UD1. The tenant 502 on the node 265 is part of a service application owned by customer B and is assigned to UD1. And, the tenant 501 is part of a service application owned by customer A and is now assigned to UD1. Upon evaluation, the nodes 255 and 265 both include tenants 501 and 502, which are all assigned to the same UD1. Thus, the nodes 255 and 265 are independent and would be colored similarly by the graph-coloring algorithm. Further, this schematic depiction 700 shows an example of a style of strategic allocation for initially placing update domains, where placing repeating pairs or sets of update domains increase the likelihood of more nodes being identified as independent nodes during the comparison process.

Figure 8:
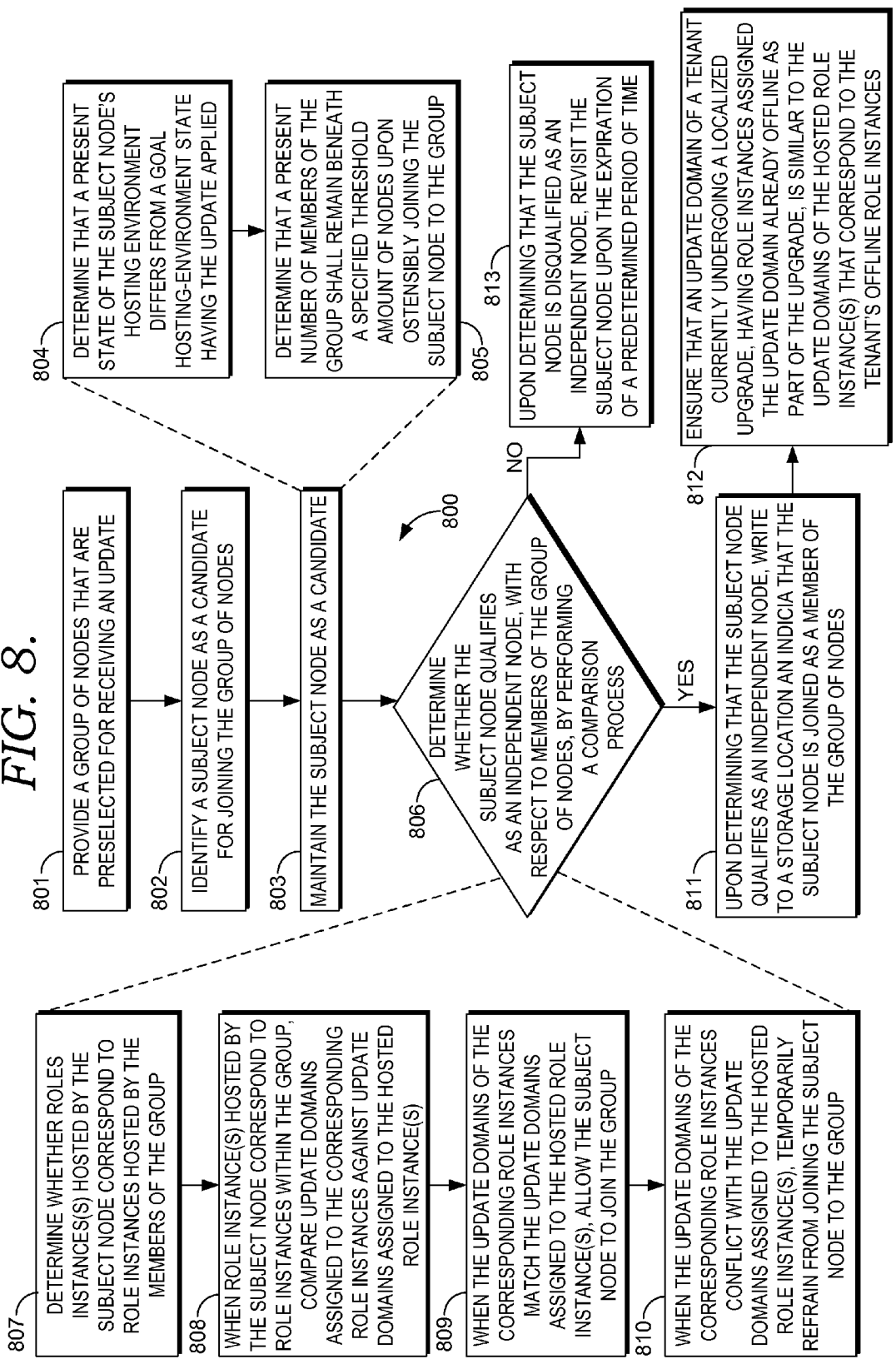
FIG. 8 is a flow diagram showing an overall method for updating one or more nodes of a data center in compliance with service models of service applications running within the data center, in accordance with an embodiment of the present invention.

Turning to FIG. 8, a flow diagram is illustrated that shows an overall method 800 for updating one or more nodes of a data center in compliance with service models of service applications running within the data center, in accordance with an embodiment of the present invention. The method 800 includes providing a group of independent nodes that are preselected for receiving an update, as depicted at block 801. At some point, a subject node is identified as a candidate for joining the group, as depicted at block 802. As depicted at block 803, the subject node may remain a candidate if the following criteria are met: determining that a present state of the subject node's hosting environment (e.g., root OS or hypervisor) differs from a goal hosting-environment state having the update applied (see block 804); and determining that a present number of members of the group shall remain beneath a specified threshold amount of nodes upon ostensibly joining the subject node to the group (see block 805).

Upon satisfying at least the criteria above, the fabric controller may determine whether subject node qualifies as an independent node with respect to members of the group, as depicted at block 806. This step of determining the subject node's independence may be carried out by performing one or more of the following comparison process: determining whether tenant(s) hosted by the subject node correspond to tenants hosted by the members of the group (see block 907); when the tenant(s) hosted by the subject node correspond to any of the tenants within the group, comparing update domains assigned to the corresponding tenants against update domains assigned to the hosted tenant(s) (see block 808); when the update domains of the corresponding tenants match the update domains assigned to the hosted tenant(s), allowing the subject node to join the group (see block 809); and when the update domains of the corresponding tenants conflict with the update domains assigned to the hosted tenant(s), temporarily refraining from joining the subject node to the group (see block 810). Further, upon determining that the subject node qualifies as an independent node, the method 800 involves writing to a storage location (e.g., listing enumerating a current membership of the group) an indicia that the subject node is joined as a member of the group, as depicted at block 811. Otherwise, as depicted at block 811, upon determining that the subject node is disqualified as an independent node, the fabric controller may revisit at some later time (e.g., expiration of a predetermined amount of time) the subject node.

Figure 9:
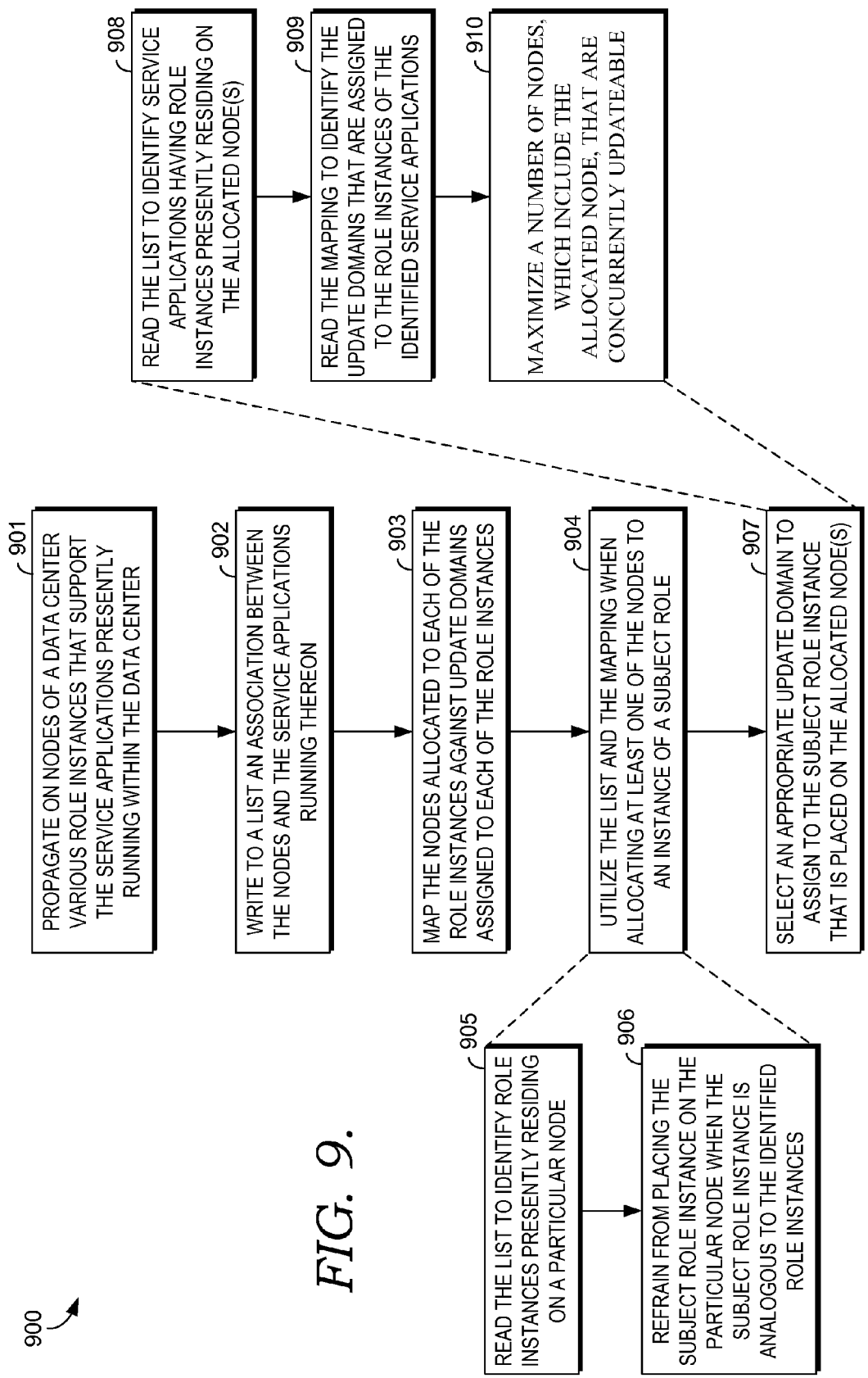
FIG. 9 is a flow diagram showing an overall method for allocating nodes to role instances of service applications with consideration of update domains assigned to the role instances, in accordance with an embodiment of the present invention.

Turning now to FIG. 9, a flow diagram is illustrated that shows an overall method 900 for allocating nodes to role instances of service applications with consideration of update domains assigned to the role instances, in accordance with an embodiment of the present invention. As depicted at block 901, one step of the method 900 may include propagating on distributed nodes of a data center various role instances that support the service applications presently running within the data center. An association between the nodes and the service applications running thereon may be written to a list, as depicted at block 902. Further, the nodes allocated to each of the role instances may be mapped against update domains assigned to each of the role instances, as depicted at block 903.

In an exemplary embodiment, the mechanism (e.g., fabric controller) carries out the method by employing the list and the mapping when allocating node(s) to an instance of a subject role, as depicted at block 904. The step of allocating the node(s) to an instance of a subject role may include reading the list to identify role instances presently residing on a particular node (see block 905), and refraining from placing the subject role instance on the particular node when the subject role instance is analogous to the identified role instances (see block 906).

The method 900 may further involve the step of selecting an appropriate update domain to assign to the subject role that is placed on the allocated node(s), as depicted at block 907. Typically, selection facilitates maximizing a number of nodes, which include the allocated node, that are updateable in tandem. In embodiments, selecting the appropriate update domain to assign to the subject role includes one or more of the following steps: reading the list to identify service applications having role instances presently residing on the allocated node (see block 908); reading the mapping to identify the update domains that are assigned to the role instances of the identified service applications (see block 909); ascertaining an update domain of the identified update domains that most frequently appears on nodes of the data center that host the role instances of the identified service applications (see block 910); and assigning the most-frequently-appearing update domain to the subject role (see block 911).

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage media having computer-executable instructions embodied thereon that, when executed, perform a method for updating one or more nodes of a data center in compliance with service models of service applications running within the data center of a distributed computing platform, the method comprising:

providing a group of nodes that are preselected for receiving an update, wherein a node represents a virtual or hardware machine host on which one or more tenants are running for implementing a service application managed, in part, by the data center;

identifying a first node as a candidate for joining the group of nodes;

determining whether the first node qualifies as an independent node with respect to members of the group of nodes by performing a comparison process comprising:

(a) determining whether one or more tenants hosted by the first node correspond to tenants hosted by the members of the group of nodes, wherein one or more of the members of the group of nodes each host a plurality of tenants belonging to a plurality of service applications, respectively, and wherein the tenants comprise instances of roles that each represent respective component programs for carrying out particular functional aspects of the service application;

(b) when the one or more tenants hosted by the first node correspond to any of the tenants within the group of nodes, comparing update domains assigned to the corresponding tenants against update domains assigned to the one or more hosted tenants, wherein an update domain represents a percentage of instances of a particular role of a service application that are allowed to be concurrently offline, wherein the percentage of the role instances is determined, in part, by a service model established for the service application; and (c) when the update domains of the corresponding tenants match the update domains assigned to the one or more hosted tenants, allowing the first node to join the group of nodes;

upon determining that the first node qualifies as an independent node, joining the first node to the group of nodes; and upon determining that the first node qualifies as an independent node, writing to a storage location an indicia that the first node is joined as a member of the group of nodes.

2. The computer-readable media of claim 1, the method further comprising, prior to identifying the first node as a candidate for joining the group of nodes, receiving an indication to install a patch to an operating system residing on the nodes of a data center.

3. The computer-readable media of claim 2, wherein the nodes of the data center represent computing devices capable of running tenants of the service application within a distributed computing platform.

4. The computer-readable media of claim 2, wherein the method further comprises:

reevaluating whether the first node qualifies to join the group of nodes upon waiting a predetermined period of time after refraining from joining the first node to the group of nodes; and employing a revised membership of the group of nodes, as it stands upon the predetermined amount of time elapsing, when determining whether the first node qualifies to join the group of nodes.

5. The computer-readable media of claim 1, wherein no two members of the group of nodes host analogous tenants, respectively, of a common service application that are assigned to differing update domains.

6. The computer-readable media of claim 1, wherein the method further comprises removing the first node as a candidate upon determining that a present state of the first node's hosting environment is comparable to a goal hosting-environment state having the update applied.

7. The computer-readable media of claim 1, wherein the method further comprises maintaining the first node as a candidate upon determining that a present number of members of the group of nodes remains beneath a specified threshold amount of nodes upon ostensibly joining the first node to the group of nodes.

8. The computer-readable media of claim 1, wherein the update-domain dependencies each denote a condition in which two or more nodes host analogous tenants of a common service application are assigned to distinct update domains, respectively.

9. The computer-readable media of claim 8, wherein a graph-coloring algorithm is employed to select nodes of the data center that mutually lack update-domain dependencies in relation to each other.

10. The computer-readable media of claim 9, the method further comprising:

identifying a second node as a candidate for joining the group of nodes; and upon joining the first node as a member of the group of nodes, applying update-domain dependencies associated with the first node when determining whether the second node qualifies to join the group of nodes.

11. The computer-readable media of claim 10, wherein the group of nodes comprises one or more members actively receiving the update and residing in an offline mode, and a remainder of the members of the group of nodes being passively staged to receive the update and residing in an online mode.

12. The computer-readable media of claim 11, the method further comprising:

transitioning the first node from the online mode to the offline mode to receive the update;

upon the first node receiving the update, bringing the first node into the online mode; and discontinuing application of the update-domain dependencies associated with the first node when determining whether the second node qualifies to join the group of nodes.

13. The computer-readable media of claim 1, wherein the method further comprises:

determining that the assigned update domains are dissimilar upon comparing the tenants hosted by the first node against the corresponding tenants hosted by the members of the group of nodes;

determining that the first node fails to qualify for membership within the group of nodes; and temporarily refraining from joining the first node to the group of nodes.

14. A computer system for performing a method that comprehensively updates nodes of a data center with consideration of both service models established for customers of the data center and pending localized comprehensive updates of service applications owned by the customers of a distributed computing platform, the computer system comprising a processing unit coupled to a computer storage medium, the computer storage medium having stored thereon a plurality of computer software components executable by the processing unit, the computer software components comprising:

a fabric controller for initiating the comprehensive update to the nodes of the data center, wherein the comprehensive update concurrently affects a group of nodes that are determined to be independent of one another, wherein a node represents a virtual or hardware machine host on which one or more tenants are running for implementing at least one of the service applications managed, in part, by the data center, and wherein the determination of independence involves a comparison process comprising:

(a) maintaining a listing of tenants hosted by members of the group of nodes, wherein the tenants comprise instances of roles that each represent respective component programs for carrying out particular functional aspects of the service applications;

(b) mapping an indication of update domains assigned to the tenants, respectively, within the listing, wherein each of the update domains represents a percentage of instances of the particular role of the particular service application that are allowed to be concurrently offline, as dictated by a service model established for the particular service application;

(c) disallowing a subject node to join the group of nodes upon determining that the subject node hosts one or more tenants that correspond to at least one of the tenants enumerated by the listing and that the one or more subject-node tenants are assigned an update domain that are distinct from the update domain mapped to the at least one corresponding tenant of the listing; and (d) allowing the subject node to join the group of nodes upon determining that the subject node hosts one or more tenants that correspond to at least one of the tenants enumerated by the listing and that the one or more subject-node tenants are assigned an update domain that is indistinct from the update domain mapped to the corresponding tenants of the listing; and a synchronization mechanism that ensures the service model is not violated by performing a synchronization process comprising:

(e) identifying that a localized update is pending for the particular service application; and (f) appending as entries to the listing indications of update domains assigned to tenants of the particular service application, thereby abstaining from joining nodes hosting the tenants of the particular service application to the group of nodes designated to receive the comprehensive update.

\* \* \* \* \*